US009442571B2

(12) United States Patent
Hou (10) Patent No.: US 9,442,571 B2
(45) Date of Patent: Sep. 13, 2016

(54) CONTROL METHOD FOR GENERATING CONTROL INSTRUCTION BASED ON MOTION PARAMETER OF HAND AND ELECTRONIC DEVICE USING THE CONTROL METHOD (71) Applicant: Lenovo (Beijing) Co., Ltd., Haidian District, Beijing (CN)

(72) Inventor: Xinru Hou, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 78 days.

(21) Appl. No.: 14/230,059

(22) Filed: Mar. 31, 2014

(65) Prior Publication Data
US 2015/0015542 A1 Jan. 15, 2015

(30) Foreign Application Priority Data

Jul. 15, 2013 (CN) .......................... 2013 1 0295744

(51) Int. Cl.
*G06F 3/01* (2006.01)
*G06F 3/03* (2006.01)
*G06F 3/0484* (2013.01)
(52) U.S. Cl.
CPC ............. *G06F 3/017* (2013.01); *G06F 3/0304* (2013.01); *G06F 3/04842* (2013.01)
(58) Field of Classification Search
CPC .................................. G06F 3/017; G06F 3/045
See application file for complete search history.

(56) References Cited

U.S. PATENT DOCUMENTS

| 8,902,198 | B1* | 12/2014 | Karakotsios et al. ........ 345/175 |
| 2009/0103780 | A1* | 4/2009 | Nishihara et al. ............ 382/103 |
| 2012/0249417 | A1* | 10/2012 | Cho et al. .................... 345/156 |
| 2013/0300662 | A1* | 11/2013 | Liu .............................. 345/158 |
| 2013/0342443 | A1* | 12/2013 | Huang .................... G06F 3/017 345/156 |
| 2014/0324197 | A1* | 10/2014 | Mizuno ........................ 700/83 |
| 2015/0169073 | A1* | 6/2015 | Isayama ............... G06F 3/0484 |
| 2015/0220149 | A1* | 8/2015 | Plagemann et al. .... G06F 3/017 |

* cited by examiner

*Primary Examiner* — Larry Sternbane
(74) *Attorney, Agent, or Firm* — Brinks Gilson & Lione; G. Peter Nichols (57) ABSTRACT A control method and an electronic device are described where the method includes acquiring a real-time collection image regarding a space operation area; according to the real-time collection image, determining whether a first finger and a second finger belonging to a same hand of a user are present in the space operation area; acquiring a first distance between a first fingertip portion of the first finger and a second fingertip portion of the second finger, and generating a first determination result according to the first distance; determining whether the first fingertip portion leaves the second fingertip portion along a direction away from the user's body or approaches the second fingertip portion along a direction approaching the user's body; acquiring a motion parameter of the first fingertip portion; and generating a control instruction according to the motion parameter of the first fingertip portion.

11 Claims, 4 Drawing Sheets

CONTROL METHOD FOR GENERATING CONTROL INSTRUCTION BASED ON MOTION PARAMETER OF HAND AND ELECTRONIC DEVICE USING THE CONTROL METHOD

BACKGROUND

This application claims priority to Chinese patent application No. 201310295744.6 filed on Jul. 15, 2013, the entire contents of which are incorporated herein by reference.

The present disclosure relates to a control method applied to an electronic devices and the corresponding electronic device.

In recent years, electronic devices such as notebook computers, tablet computers, smart phones, cameras, portable multimedia players or the like are widely applied. In these electronic devices, there are usually included a touch sensing unit for receiving the input of a user or an input unit such as a keyboard, mouse or the like so as to facilitate the user's operation. The touch sensing unit may include a touch sensing area which can be composed of sensor elements such as capacitive touch sensors or resistive touch sensors or the like. The user may perform actions such as click, double-click, drag or the like on a touch control area to realize corresponding control functions. However, with the development of technology, the processing capability of a processor is improved, and functions which can be provided by an electronic device to the user are increasing continually. The above simple touch operations such as click, double-click or the like have been already unable to meet more and more diverse operation requirement of the user.

On the other hand, inputting via a touch sensing unit or an input unit such as a keyboard, mouse or the like is not suitable for all electronic devices. For example, as to an electronic device such as a television or the like which has a distance from the user when being used, the user generally needs to operate it by a remote control. As another example, as to a head-mounted electronic device, the user cannot see the touch sensing unit, button or the like set on the head-mounted electronic device, thus it is difficult to perform complex operations.

SUMMARY

Embodiments of the present disclosure aim at providing a method for extracting a target object and a corresponding electronic device to solve the above problem.

An embodiment of the present disclosure provides a control method applied to an electronic device. The control method comprises: performing collection on a space operation area through a collection unit and acquiring a real-time collection image regarding the space operation area; according to the real-time collection image, determining whether a first finger and a second finger belonging to a same hand of a user are present in the space operation area; when determining that the first finger and the second finger belonging to the same hand of the user are present in the space operation area, acquiring a first distance between a first fingertip portion of the first finger and a second fingertip portion of the second finger, and generating a first determination result according to the first distance; according to a real-time collection image collected after the first determination result is generated, further determining whether the first fingertip portion leaves the second fingertip portion along a direction away from the user's body or determining whether the first fingertip portion approaches the second fingertip portion along a direction approaching the user's body; when determining that the first fingertip portion leaves the second fingertip portion along the direction away from the user's body or determining that the first fingertip portion approaches the second fingertip portion along the direction approaching the user's body, acquiring a motion parameter of the first fingertip portion according to the real-time collection image collected after the first determination result is generated; and generating a control instruction according to the motion parameter of the first fingertip portion.

Another embodiment of the present disclosure provides an electronic device, comprising: a collection unit configured to perform collection on a space operation area and acquire a real-time collection image regarding the space operation area; an operating body identification unit configured to determine, according to the real-time collection image, whether a first finger and a second finger belonging to a same hand of a user are present in the space operation area; a first distance detection unit configured to acquire a first distance between a first fingertip portion of the first finger and a second fingertip portion of the second finger when it is determined that the first finger and the second finger belonging to the same hand of the user are present in the space operation area, and to generate a first determination result according to the first distance; a second distance detection unit configured to further determine, according to a real-time collection image collected after the first determination result is generated, whether the first fingertip portion leaves the second fingertip portion along a direction away from the user's body or whether the first fingertip portion approaches the second fingertip portion along a direction approaching the user's body; a parameter acquisition unit configured to acquire a motion parameter of the first fingertip portion according to the real-time collection image collected after the first determination result is generated when it is determined that the first fingertip portion leaves the second fingertip portion along the direction away from the user's body or that the first fingertip portion approaches the second fingertip portion along the direction approaching the user's body; and an instruction generation unit configured to generate a control instruction according to the motion parameter of the first fingertip portion.

In the above solutions provided by embodiments of the present disclosure, the user may conveniently control an electronic device such as a television or the like which has a distance from the user when being used even without using a remote control, and may conveniently control a portable electronic device such as a head-mounted electronic device or the like even without seeing the touch sensing unit, button or the like. In addition, in the above solutions provided by embodiments of the present disclosure, the user input is determined and the corresponding control instruction is generated by detecting the distance between the first fingertip portion and the second fingertip portion without requiring precise correspondence between the user input and the content displayed by the electronic device, thereby the operation requirement on the user is reduced.

BRIEF DESCRIPTION OF THE DRAWINGS

In order to explain technical solutions of embodiments of the present disclosure more clearly, attached drawings required in the description of embodiments will be introduced simply in the following. The attached drawings described below are only exemplary embodiments of the present disclosure.

DETAILED DESCRIPTION

In the following, preferred embodiments of the present disclosure will be described in detail by reference to attached drawings. It is noted that substantially same steps and elements are denoted by same reference signs in the specification and attached drawings and that repeated explanation of these steps and elements will be omitted.

In the following embodiments of the present disclosure, the specific form of an electronic device includes, but is not limited to, a smart television, a smart mobile phone, a desktop computer, a personal digital assistant, a portable computer, a tablet computer, a multimedia player or the like. According to one example of the present disclosure, the electronic device may be a handheld electronic device. According to another example of the present disclosure, the electronic device may be a head-mounted electronic device. In addition, according to a further example of the present disclosure, the electronic device may also be a non-portable terminal device such as a desktop computer, a television or the like. In embodiments according to the present disclosure, the electronic device may include a collection unit.

Figure 1:
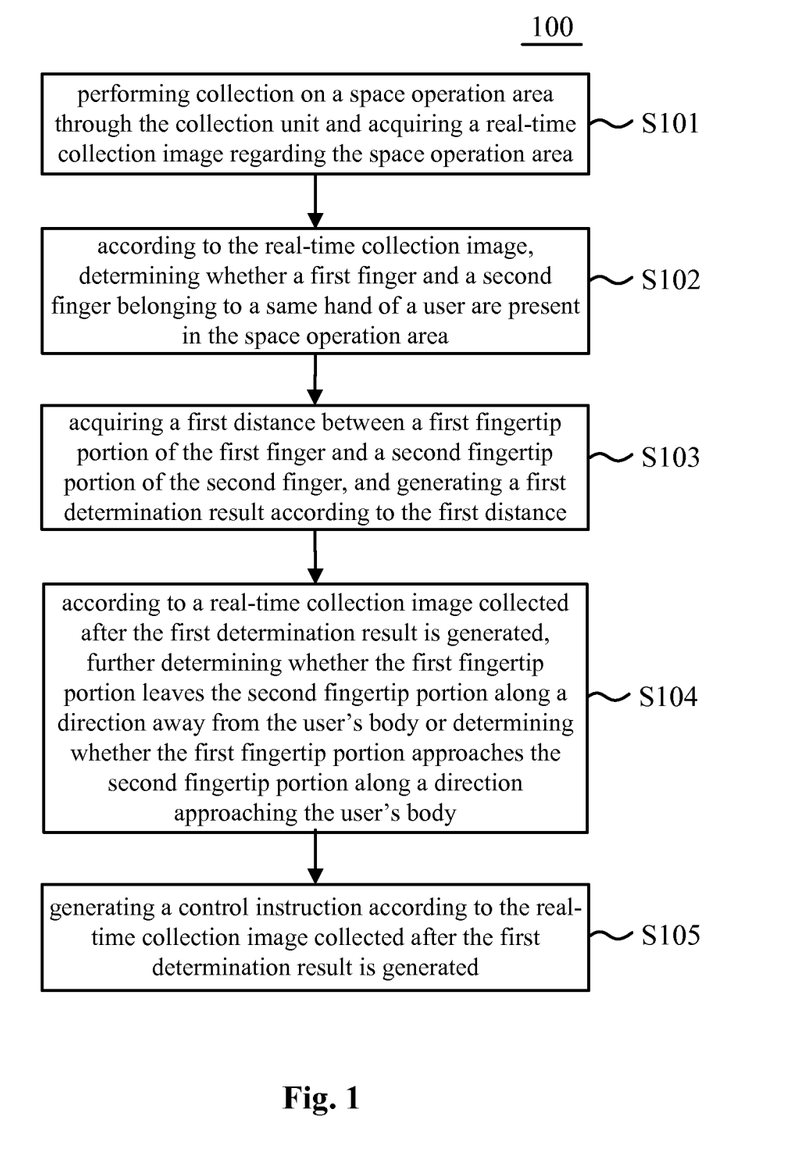
FIG. 1 is a flowchart describing a control method according to an embodiment of the present disclosure.

FIG. 1 is a flowchart describing a control method 100 according to an embodiment of the present disclosure. In the following, the control method according to the embodiment of the present disclosure will be described by reference to FIG. 1. The control method 100 may be used with the above electronic device.

As shown in FIG. 1, in step S101, collection is performed on a space operation area through the collection unit and a real-time collection image regarding the space operation area is acquired. In a case that the electronic device is a handheld electronic device or a head-mounted electronic device, the collection direction of the collection unit of the electronic device may be same with or similar to the viewing direction of a user. That is to say, the space operation area may be located at a same side of the electronic device and the user. For example, in a case that the electronic device is a head-mounted electronic device, the collection unit may be set at a position corresponding to the position where the eyes of the user should be located after the head-mounted electronic device is worn by the user, so that the collection unit may perform collection along the viewing direction of the user. In a case that the electronic device is a non-portable terminal device such as a smart television or the like, the collection unit may be set near a display unit of the electronic device, so that the collection unit may perform collection along a direction substantially opposite to the viewing direction of the user in a case that the user watches the content displayed by the electronic device. That is to say, the space operation area may be located between the electronic device and the user.

Then, in step S102, it is determined whether a first finger and a second finger belonging to a same hand of the user are present in the space operation area according to the real-time collection image. When it is determined in step S102 that the first finger and the second finger belonging to the same hand of the user are present in the space operation area, in step S103, a first distance between a first fingertip portion of the first finger and a second fingertip portion of the second finger is acquired, and a first determination result is generated according to the first distance. And, in step S104, it is further determined, according to a real-time collection image collected after the first determination result is generated, whether the first fingertip portion leaves the second fingertip portion along a direction away from the user's body or whether the first fingertip portion approaches the second fingertip portion along a direction approaching the user's body. That is to say, the finger moves along a direction vertical to the front of the user's body. In other words, in a case that the electronic device is a head-mounted glasses electronic device, the finger moving along a direction vertical to the front of the user's body is that the finger moves along a direction vertical to the front of the lens of the head-mounted glasses electronic device.

According to one example of the present disclosure, it can be determined whether the user conducts a fillip action in a direction vertical to the plane where the user's body is located according to the real-time collection image. When the user is ready to conduct the fillip action, the fingertip of a thumb usually contacts the fingertip of another finger such as a middle finger, and the fingertip of the thumb and the another finger enclose an area which is approximately a circle. When the user conducts the fillip action, the fingertip of the other finger is moving away from the fingertip of the thumb. Thus, for example, step S103 may include determining whether the fingertip of the first finger contacts the fingertip of the second finger according to the first distance between the first fingertip portion of the first finger and the second fingertip portion of the second finger, and further determining whether the contact of the first finger with the second finger encloses a closed area similar to a circle or the like when determining that the fingertip of the first finger contacts the fingertip of the second finger. When determining that the contact of the first finger with the second finger encloses a closed area, in step S103, the first determination result may also be generated to indicate that the user conducts a fillip warm-up action. In step S104, it may be further determined whether the first fingertip portion leaves the second fingertip portion along the direction away from the user's body according to the real-time collection image collected after the first determination result is generated, and it can be determined that the user conducts a fillip action when determining that the first fingertip portion leaves the second fingertip portion along the direction away from the user's body.

According to another example of the present disclosure, it can be determined whether the user conducts a finger-clasping action in a direction vertical to a plane where the user's body is located according to the real-time collection image. When the user is ready to conduct the finger-clasping action, the fingertip of another finger such as forefinger is usually away from the fingertip of the thumb; while when the user conducts a fillip action, the fingertip of the another finger is close to the fingertip of the thumb. Thus, for example, step S103 may include determining, according to the first distance between the first fingertip portion of the first finger and the second fingertip portion of the second finger, whether the first distance between the first fingertip portion of the first finger and the second fingertip portion of the second finger is larger than or equal to a predetermined value. And, when it is determined that the first distance between the first fingertip portion of the first finger and the second fingertip portion of the second finger is larger than or equal to the predetermined value, the first determination result may also be generated in step S103 to indicate that the user conducts a finger-clasping warm-up action. In step S104, it may be further determined, according to the real-time collection image collected after the first determination result is generated, whether the first fingertip portion approaches the second fingertip portion along a direction approaching the user's body, and when it is determined that the first fingertip portion approaches the second fingertip portion along the direction approaching the user's body, it may be determined that the user conducts a finger-clasping action.

In addition, according to a further example of the present disclosure, it may also be determined whether the fingers of the user conduct a contraction/expansion action in a direction vertical to the front of his/her body according to the real-time collection image.

When it is determined that the first fingertip portion leaves the second fingertip portion along the direction away from the user's body or that the first fingertip portion approaches the second fingertip portion along the direction approaching the user's body, in step S105, a control instruction is generated according to the real-time collection image collected after the first determination result is generated.

For example, in a case that it is determined that the fingertip of the first finger contacts the fingertip of the second finger according to the first distance between the first fingertip portion of the first finger and the second fingertip portion of the second finger, and that the contact of the first finger with the second finger encloses a closed area similar to a circle or the like in step S103, when it is determined that the first fingertip portion leaves the second fingertip portion along the direction away from the user's body in step S104, the control instruction is generated according to the real-time collection image collected after the first determination result is generated.

As another example, in a case that it is determined that the first distance between the first fingertip portion of the first finger and the second fingertip portion of the second finger is larger than or equal to the predetermined value according to the first distance between the first fingertip portion of the first finger and the second fingertip portion of the second finger in step S103, when it is determined that the first fingertip portion approaches the second fingertip portion along the direction approaching the user's body in step S104, the control instruction is generated according to the real-time collection image collected after the first determination result is generated.

According to one example of the present disclosure, in step S105, a motion parameter of the first fingertip portion may be acquired according to the real-time collection image collected after the first determination result is generated, and the control instruction is then generated according to the motion parameter of the first fingertip portion. For example, the movement speed of the first fingertip portion in the procedure of moving away from or approaching the second fingertip portion may be acquired according to the real-time collection image collected after the first determination result is generated, and the control instruction is then generated according to the movement speed of the first fingertip portion.

For example, the electronic device may include a display unit. And, the display unit may display a first image. The user may instruct to zoom out the first image through a fillip action. When it is determined that the user conducts a fillip action in step S104 and the first determination result is generated, a control instruction to zoom out the first image at a particular speed may be generated according to the movement speed of the first fingertip portion acquired in step S105. For example, the faster the movement speed of the first fingertip portion is, the faster the speed at which the first image is zoomed out may be. In addition, the user may also instruct to zoom in the first image through a finger-clasping action. When it is determined that the user conducts a finger-clasping action in step S104 and the first determination result is generated, a control instruction to zoom in the first image at a particular speed may be generated according to the movement speed of the first fingertip portion acquired in step S105. For example, the faster the movement speed of the first fingertip portion is, the faster the speed at which the first image is zoomed in may be.

According to another example of the present disclosure, the control instruction may be generated according to a second distance between the first fingertip portion and the second fingertip portion after the first fingertip portion stops moving away from or approaching the second fingertip portion or both the first distance and the second distance between the first fingertip portion and the second fingertip portion. For example, in step S105, it may be determined whether the first fingertip portion stops moving according to the real-time collection image collected after the first determination result is generated, and when it is determined that the first fingertip portion stops moving, the second distance between the first fingertip portion of the first finger and the second fingertip portion of the second finger is acquired. Then, a control instruction for a target object is generated according to the first distance and the second distance.

According to another example of the present disclosure, the control instruction may also be generated according a real-time distance between the first fingertip portion and the second fingertip portion when the first fingertip portion is moving. For example, in step S105, a third distance between the first fingertip portion of the first finger and the second fingertip portion of the second finger may be determined in real time according to the real-time collection image collected after the first determination result is generated. Then, the control instruction is generated according to the third distance.

In addition, according to another example of the present disclosure, the control method 100 shown in FIG. 1 may further include displaying a user interface which includes multiple operation objects therein. When it is determined that the contact of the first finger with the second finger encloses a closed area in step S104 and the first determination result is generated, the method shown in FIG. 1 may further include acquiring a mapping position in the user interface of the contact point where the first finger contacts the second finger, and among the multiple operation objects of the user interface, a target object corresponding to the mapping position is determined. Then, in step S105, when it is determined that the first fingertip portion leaves the second fingertip portion along the direction away from the user's body or that the first fingertip portion approaches the second fingertip portion along the direction approaching the user's body, the control instruction may be generated according to the real-time collection image collected after the first determination result is generated.

In the solution of the control method provided in the present embodiment, the user may conveniently control an electronic device such as a television or the like which has a distance from the user when being used even without using a remote control, and may conveniently control a portable electronic device such as a head-mounted electronic device or the like even without seeing the touch sensing unit, button or the like. In addition, in the solution of the control method provided in the present embodiment, the user input is determined and the corresponding control instruction is generated by detecting the distance between the first fingertip portion and the second fingertip portion without requiring precise correspondence between the user input and the content displayed by the electronic device, thereby the operation requirement on the user is reduced.

In addition, there is provided a control method according to another embodiment of the present disclosure, the control method is applied to an electronic device including a collection unit, and the control method includes: performing collection on a space operation area through the collection unit and acquiring a real-time collection image regarding the space operation area; according to the real-time collection image, determining whether a first operating body and a second operating body are present in the space operation area. According to one example of the present disclosure, the first operating body may be a first hand of a first user or a first finger of the first hand, and the second operating body may be a second hand of a first user or a first finger of a second hand. In addition, of course, the second operating body may also be a first hand of a second user or a first finger of the first hand of the second user. The first operating body and the second operating body may be two moving objects. Specifically, the movement trajectory of the first operating body is approximately vertical to the first user's body. According to one example of the present disclosure, the electronic device may be a wearable electronic device, and the first user may wear the electronic device. Alternatively, the electronic device may be non-wearable electronic device, the first user is a user located at a distance from the electronic device at one side thereof. Specifically, the one side of the electronic device may be the side having a display screen of the electronic device. For example, the electronic device is a smart television, and the user is located at the front of the screen of the smart television and has a predetermined distance from the screen of the smart television so that the collection unit of the smart television collects actions of the user. The movement trajectory of the second operating body is also approximately vertical to the first user's body. In other words, if the plane where the first user is located is a two-dimensional plane, the movement of the first operating body is a movement conducted along a coordinate axis vertical to the two-dimensional plane, and the movement of the second operating body is a movement conducted along the coordinate axis vertical to the two-dimensional plane likewise.

When it is determined that the first operating body and the second operating body are present in the space operation area, a first distance between the first operating body and the second operating body is acquired, and a first determination result is generated according to the first distance; according to the real-time collection image collected after the first determination result is generated, it is further determined whether the second operating body leaves the first operating body along a direction away from the first user's body or whether the second operating body approaches the first operating body along a direction approaching the first user's body; when it is determined that the second operating body leaves the first operating body along the direction away from the first user's body, a first control instruction is generated, or/and when it is determined that the second operating body approaches the first operating body along the direction approaching the first user's body, a second control instruction is generated.

In one embodiment of the present disclosure, in a case that multiple objects are displayed on the electronic device and the multiple objects overlap, when it is determined that the second operating body leaves the first operating body along the direction away from the first user's body, the first control instruction is generated to instruct to expandedly display the multiple objects in a manner of three-dimensional display along the direction away from the first user's body.

In another embodiment of the present disclosure, in a case that multiple objects are displayed on the electronic device and the multiple objects are expandedly displayed along the direction away from the first user's body, when it is determined that the second operating body approaches the first operating body along a direction approaching the first user's body, according to the real-time collection image collected after the first determination result is generated, the second control instruction is generated to instruct to pack up the expandedly displayed multiple objects in a manner of three-dimensional display along the direction approaching the first user's body until the multiple objects overlap each other.

Figure 2:
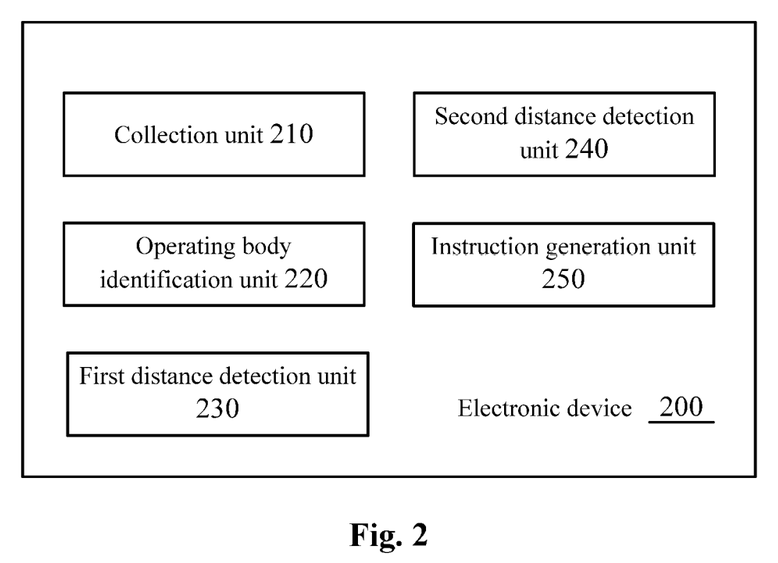
FIG. 2 is an exemplary structural diagram showing an electronic device according to an embodiment of the present disclosure.

In the following, an electronic device according to an embodiment of the present disclosure is explained by reference to FIG. 2. FIG. 2 is an exemplary structural diagram showing an electronic device 200 according to an embodiment of the present disclosure. As shown in FIG. 2, the electronic device 200 of the present embodiment includes a collection unit 210, an operating body identification unit 220, a first distance detection unit 230, a second distance detection unit 240 and an instruction generation unit 250. Respective modules of the electronic device 200 perform respective steps/functions of the method 200 matching a device in FIG. 1, thus, it is no longer described specifically for the purpose of concise description.

The collection unit 210 performs collection on a space operation area and acquires a real-time collection image regarding the space operation area. In a case that the electronic device 200 is a handheld electronic device or a head-mounted electronic device, the collection direction of the collection unit 210 of the electronic device may be same with or similar to the viewing direction of a user. That is to say, the space operation area may be located at a same side of the electronic device and the user. For example, in a case that the electronic device 200 is a head-mounted electronic device, the collection unit 210 may be set at a position corresponding to the position where the eyes of the user should be located after the head-mounted electronic device is worn by the user, so that the collection unit may perform collection along the viewing direction of the user. In a case that the electronic device is a non-portable terminal device such as a smart television or the like, the collection unit 210 may be set near a display unit of the electronic device 200, so that the collection unit 210 may perform collection along a direction substantially opposite to the viewing direction of the user in a case that the user watches the content displayed by the electronic device. That is to say, the space operation area may be located between the electronic device and the user.

Then, the operating body identification unit 220 determines whether a first finger and a second finger belonging to a same hand of a user are present in the space operation area according to the real-time collection image. When the operating body identification unit 220 determines that the first finger and the second finger belonging to the same hand of the user are present in the space operation area, the first distance detection unit 230 may acquire a first distance between a first fingertip portion of the first finger and a second fingertip portion of the second finger, and generate a first determination result according to the first distance. And, the second distance detection unit 240 may further determine, according to the real-time collection image collected after the first determination result is generated, whether the first fingertip portion leaves the second fingertip portion along a direction away from the user's body or whether the first fingertip portion approaches the second fingertip portion along a direction approaching the user's body. Preferably, in order to more accurately determine whether the first fingertip portion leaves the second fingertip portion along the direction away from the user's body or whether the first fingertip portion approaches the second fingertip portion along the direction approaching the user's body, the collection unit 210 may include more than one image collection means to capture the first fingertip portion and the second fingertip portion located in the space operation area from different angles and to determine whether the first fingertip portion leaves the second fingertip portion along the direction away from the user's body or whether the first fingertip portion approaches the second fingertip portion along the direction approaching the user's body according to images captured from different angles. Alternatively, in order to more accurately determine whether the first fingertip portion leaves the second fingertip portion along the direction away from the user's body or whether the first fingertip portion approaches the second fingertip portion along the direction approaching the user's body, the collection unit 210 may include an image collection means and an infrared detection means for assisting the image collection means to acquire a distance between a detected object and an electronic color ring.

According to one example of the present disclosure, it can be determined whether the user conducts a fillip action in a direction vertical to the plane where the user's body is located according to the real-time collection image. When the user is ready to conduct the fillip action, the fingertip of a thumb usually contacts the fingertip of another finger such as a middle finger, and the fingertip of the thumb and the another finger enclose an area which is approximately a circle. When the user conducts the fillip action, the fingertip of the other finger is moving away from the fingertip of the thumb. Thus, for example, the first distance detection unit 230 may include a contact determination module and an area determination module. The contact determination module may determine whether the fingertip of the first finger contacts the fingertip of the second finger according to the first distance between the first fingertip portion of the first finger and the second fingertip portion of the second finger, and the area determination module may determine whether the contact of the first finger with the second finger encloses a closed area similar to a circle or the like when it is determined that the fingertip of the first finger contacts the fingertip of the second finger. In addition, the first distance detection unit 230 may further include a result generation unit. When it is determined that the contact of the first finger with the second finger encloses a closed area, the result generation module may further generate the first determination result to indicate that the user conducts a fillip warm-up action. The second distance detection unit 240 may further determine whether the first fingertip portion leaves the second fingertip portion along the direction away from the user's body according to the real-time collection image collected after the first determination result is generated, and may determine that the user conducts a fillip action when it is determined that the first fingertip portion leaves the second fingertip portion along the direction away from the user's body.

According to another example of the present disclosure, it can be determined whether the user conducts a finger-clasping action in a direction vertical to a plane where the user's body is located according to the real-time collection image. When the user is ready to conduct the finger-clasping action, the fingertip of another finger such as forefinger is usually away from the fingertip of the thumb; while when the user conducts a fillip action, the fingertip of the another finger is close to the fingertip of the thumb. Thus, for example, the first distance detection unit may determine, according to the first distance between the first fingertip portion of the first finger and the second fingertip portion of the second finger, whether the first distance between the first fingertip portion of the first finger and the second fingertip portion of the second finger is larger than or equal to a predetermined value. And, when it is determined that the first distance between the first fingertip portion of the first finger and the second fingertip portion of the second finger is larger than or equal to the predetermined value, the first distance detection unit 230 may further generate the first determination result to indicate that the user conducts a finger-clasping warm-up action. The second distance detection unit 240 may further determine, according to the real-time collection image collected after the first determination result is generated, whether the first fingertip portion approaches the second fingertip portion along a direction approaching the user's body, and when determining that the first fingertip portion approaches the second fingertip portion along the direction approaching the user's body, may determine that the user conducts a finger-clasping action.

In addition, according to a further example of the present disclosure, it may also be determined whether the fingers of the user conduct a contraction/expansion action in a direction vertical to the front of his/her body according to the real-time collection image.

When it is determined that the first fingertip portion leaves the second fingertip portion along the direction away from the user's body or that the first fingertip portion approaches the second fingertip portion along the direction approaching the user's body, the instruction generation unit 250 may generate a control instruction according to the real-time collection image collected after the first determination result is generated.

For example, in a case that the first distance detection unit 230 determines that the fingertip of the first finger contacts the fingertip of the second finger according to the first distance between the first fingertip portion of the first finger and the second fingertip portion of the second finger, and the contact of the first finger with the second finger encloses a closed area similar to a circle or the like, when the second distance detection unit 240 determines that the first fingertip portion leaves the second fingertip portion along the direction away from the user's body, the instruction generation unit 250 generates the control instruction according to the real-time collection image collected after the first determination result is generated.

As another example, in a case that the first distance detection unit 230 determines that the first distance between the first fingertip portion of the first finger and the second fingertip portion of the second finger is larger than or equal to the predetermined value according to the first distance between the first fingertip portion of the first finger and the second fingertip portion of the second finger, when the second distance detection unit 240 determines that the first fingertip portion approaches the second fingertip portion along the direction approaching the user's body, the instruction generation unit 250 may generate the control instruction according to the real-time collection image collected after the first determination result is generated.

According to one example of the present disclosure, the instruction generation unit may include a parameter acquisition module and an instruction generation module. The parameter acquisition module may acquire a motion parameter of the first fingertip portion according to the real-time collection image collected after the first determination result is generated when it is determined that the first fingertip portion leaves the second fingertip portion along the direction away from the user's body or that the first fingertip portion approaches the second fingertip portion along the direction approaching the user's body. The instruction generation module may generate the control instruction according to the motion parameter of the first fingertip portion. For example, the parameter acquisition module may acquire the movement speed of the first fingertip portion in the procedure of moving away from or approaching the second fingertip portion according to the real-time collection image collected after the first determination result is generated. Then, the instruction generation module may generate the control instruction according to the movement speed of the first fingertip portion.

For example, the electronic device may include a display unit. And, the display unit may display a first image. The user may instruct to zoom out the first image through a fillip action. When the second distance detection unit 240 determines that the user conducts a fillip action and the first determination result is generated, a control instruction to zoom out the first image at a particular speed may be generated according to the movement speed of the first fingertip portion acquired by the parameter acquisition module. For example, the faster the movement speed of the first fingertip portion is, the faster the speed at which the first image is zoomed out may be. In addition, the user may also instruct to zoom in the first image through a finger-clasping action. When the second distance detection unit 240 determines that the user conducts a finger-clasping action and the first determination result is generated, the instruction generation module may generate a control instruction to zoom in the first image at a particular speed according to the movement speed of the first fingertip portion acquired by the parameter acquisition module. For example, the faster the movement speed of the first fingertip portion is, the faster the speed at which the first image is zoomed in may be.

According to another example of the present disclosure, the control instruction may be generated according a second distance between the first fingertip portion and the second fingertip portion after the first fingertip portion stops moving away from or approaching the second fingertip portion or both the first distance and the second distance between the first fingertip portion and the second fingertip portion. For example, the parameter acquisition unit may include a movement determination module and a distance acquisition module. The distance acquisition module may determine whether the first fingertip portion stops moving according to the real-time collection image collected after the first determination result is generated, and when it is determined that the first fingertip portion stops moving, the distance acquisition module may acquire the second distance between the first fingertip portion of the first finger and the second fingertip portion of the second finger. Then, the instruction generation unit 250 may generate a control instruction for a target object according to the first distance and the second distance.

As another example, the parameter acquisition unit may include only the distance acquisition module. The distance acquisition module may generate a control instruction according to a real-time distance between the first fingertip portion and the second fingertip portion when the first fingertip portion is moving. Specifically, the distance acquisition module may determine in real time a third distance between the first fingertip portion of the first finger and the second fingertip portion of the second finger according to the real-time collection image collected after the first determination result is generated. Then, the control instruction is generated according to the third distance.

In addition, according to another example of the present disclosure, the electronic device 200 may further include a display unit, a mapping unit and an object determination unit. The display unit may display a user interface which includes multiple operation objects therein. When the second distance detection unit 240 determines that the contact of the first finger with the second finger encloses a closed area and the first determination result is generated, the mapping unit may acquire a mapping position in the user interface of the contact point where the first finger contacts the second finger, and the object determination unit may determine a target object corresponding to the mapping position among the multiple operation objects of the user interface. Then, when it is determined that the first fingertip portion leaves the second fingertip portion along the direction away from the user's body or that the first fingertip portion approaches the second fingertip portion along the direction approaching the user's body, the instruction generation unit 250 may generate the control instruction according to the real-time collection image collected after the first determination result is generated. Accordingly, the user may select a target object from the displayed multiple objects and realize the control input of the target object by one fillip action, simplifying the operation required for the user to perform.

In the electronic device provided in the present embodiment, the user may conveniently control an electronic device such as a television or the like which has a distance from the user when being used even without using a remote control, and may conveniently control a portable electronic device such as a head-mounted electronic device or the like even without seeing the touch sensing unit, button or the like. In addition, in the electronic device provided in the present embodiment, the user input is determined and the corresponding control instruction is generated by detecting the distance between the first fingertip portion and the second fingertip portion without requiring precise correspondence between the user input and the content displayed by the electronic device, thereby the operation requirement on the user is reduced.

Figure 3A:
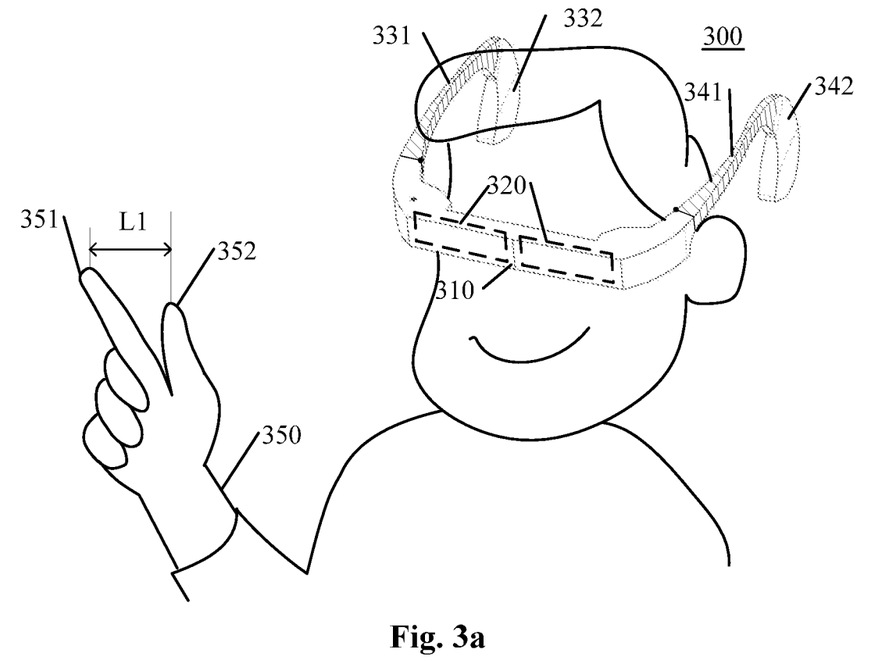
FIGS. 3*a*-3*c* are explanatory diagrams showing one exemplary case in which the electronic device shown in FIG. 2 is a glasses-type electronic device.
Figure 3B:
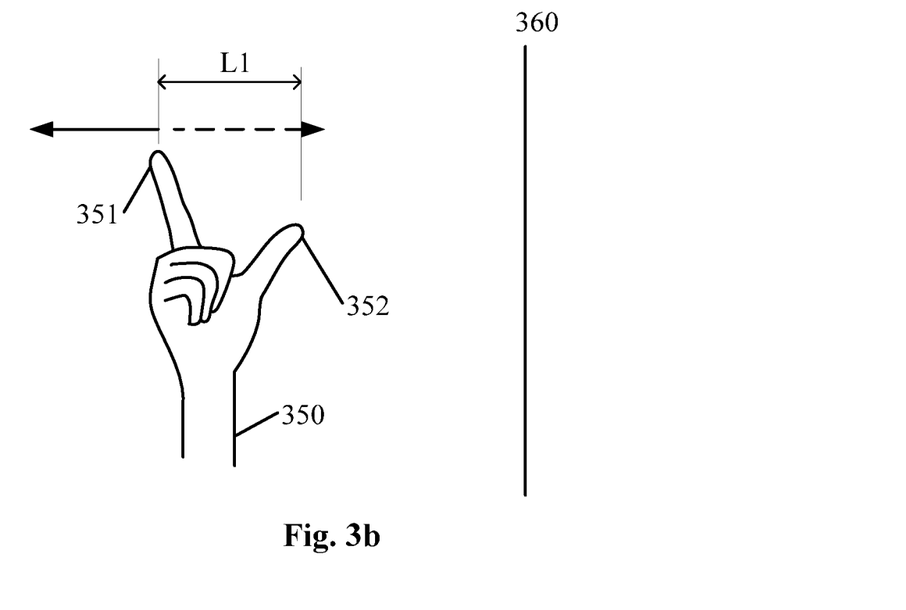
Figure 3C:
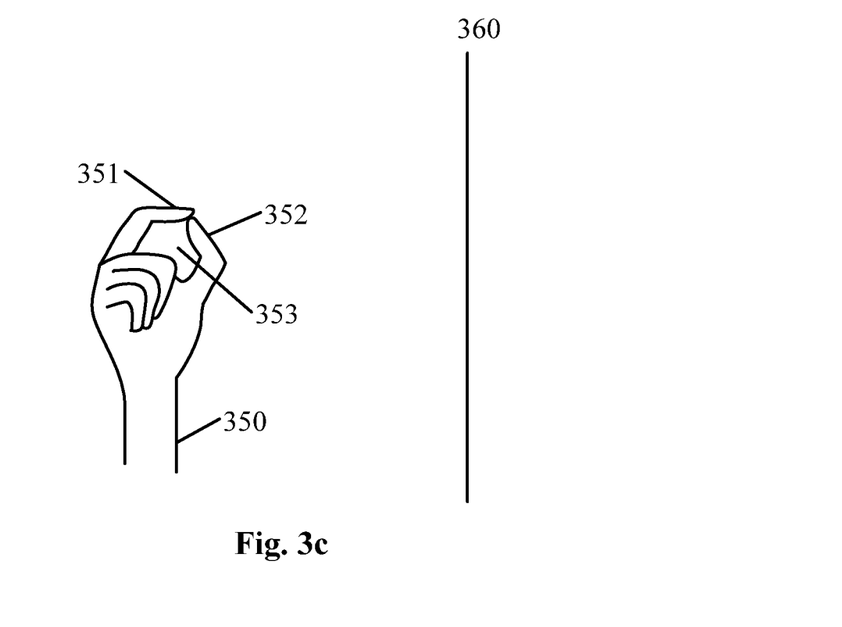

In addition, as described above, preferably, according to another example of the present disclosure, the electronic device may be a head-mounted electronic device. For example, the electronic device is a glasses-type electronic device. FIGS. 3a-3c are explanatory diagrams showing one exemplary case that the electronic device 200 shown in FIG. 2 is a glasses-type electronic device. For the purpose of conciseness, the parts of the glasses-type electronic device 300 similar to those of the electronic device 200 are no longer described in conjunction with FIGS. 3a-3c.

As shown in FIG. 3a, the electronic device 300 may further include a spectacles frame module 310, lens means 320 set in the spectacles frame module and a fixing unit. The fixing unit of the electronic device 300 includes a first supporting arm 331 and a second supporting arm 332. As shown in FIG. 3a, the first supporting arm includes a first connection portion 331 (as shown by the shaded part in FIG. 3a) and a first holding portion 332. The first connection portion 331 connects the spectacles frame module 310 to the first holding portion 332. The second supporting arm includes a second connection portion 341 (as shown by the shaded part in FIG. 3a) and a second holding portion 342. The second connection portion 341 connects the spectacles frame module 310 to the second holding portion 342. In addition, a third holding portion (not shown) may be set on the spectacles frame module 310. Specifically, the third holding portion may be set on a position of the spectacles frame module 310 located between two lenses. With the first holding portion, the second holding portion and the third holding portion, the head-mounted electronic device is held on the user's head. Specifically, the first holding portion and the second holding portion may be used for supporting the first holding arm and the second holding arm on the user's ears, while the third holding portion may be used for supporting the spectacles frame module 310 on the bridge of the nose of the user.

In the present embodiment, a collection unit (not shown) of the electronic device 300 may be set at a position corresponding to the lens means 320 to determine that images collected by the collection unit are substantially consistent with scenes seen by the user. For example, the collection unit may be set on the spectacles frame module 310 between two lens means. Alternatively, the collection unit of the electronic device 300 may also be set on the spectacles frame module 310 as corresponding to one lense of the lens means. In addition, the collection unit of the electronic device 300 may also include two collection modules which are set on the spectacles frame module 310 as corresponding respectively to two lenses. The collection unit may process images collected by the two collection modules to combine the images collected by the two collection modules, so that the processed images are more close to scenes saw by the user actually. As can be seen in FIG. 3a, the space area in front of the lens means 320 is the space operation area. The lens means 320 acquire a real-time collection image regarding the space operation area. In the case of FIG. 3, in the real-time collection image, there are a first finger 351 and a second finger 352 belonging to a same hand 350 of a user, and a first distance L1 is the distance between a first fingertip portion of the first finger 351 and a second fingertip portion of the second finger 352. The first fingertip portion of the first finger 351 can leave the second fingertip portion of the second finger 352 along a direction away from the user's body or approach the second fingertip portion of the second finger 352 along a direction approaching the user's body. Refer to FIG. 3b, assuming a plane 360 is a plane parallel to the user's chest, the direction away from the user's body (indicated by the solid arrow in FIG. 3b) and the direction approaching the user's body both (indicated by the dotted arrow in FIG. 3b) are a direction perpendicular to a plane parallel to the user's chest (that is, the plane 360). When the first fingertip portion of the first finger 351 leaves or approaches the second fingertip portion of the second finger 352, the distance therebetween may be a different second distance or third distance. Furthermore, refer to FIG. 3c, when the first fingertip portion of the first finger 351 contacts the second fingertip portion of the second finger 352, they enclose a closed area 353.

Figure 4:
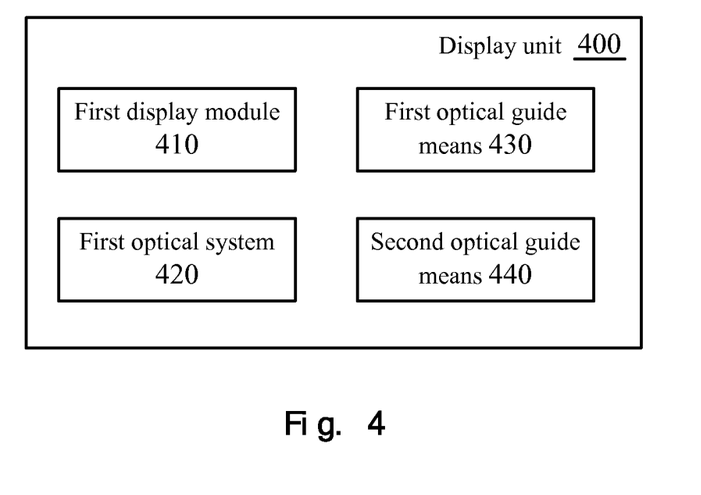
FIG. 4 is an exemplary block diagram showing a display unit in the electronic device according to an embodiment of the present disclosure.
Figure 5:
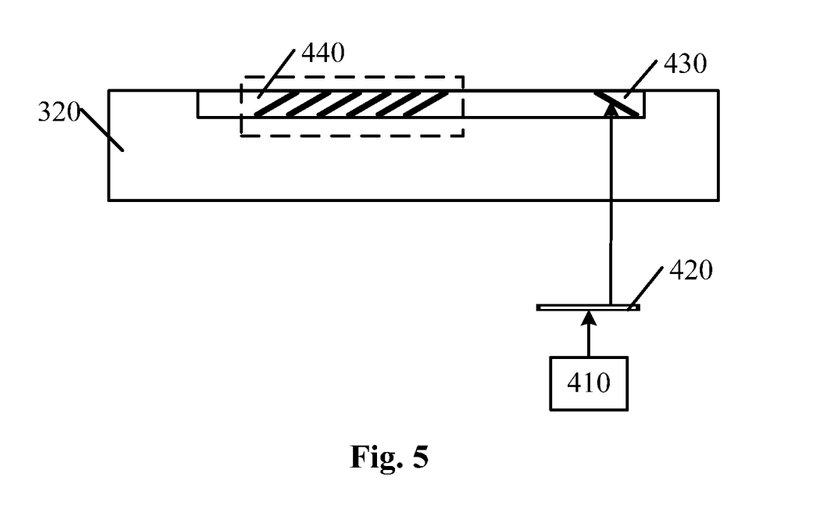
FIG. 5 is an explanatory diagram showing one exemplary case of the display unit shown in FIG. 4.

FIG. 4 is an exemplary block diagram showing a display unit 400 in the electronic device 300 according to an embodiment of the present disclosure. As shown in FIG. 4, the display unit 400 may include a first display module 410, a first optical system 420, a first optical guide means 430 and a second optical guide means 440. FIG. 5 is an explanatory diagram showing one exemplary case of the display unit 400 shown in FIG. 4.

The first display module 410 may be set in the spectacles frame module 310 and be connected with a first data transmission line. The first display module 410 may display a first image according to a first video signal transmitted by the first data transmission line of the electronic device 300. The first data transmission line may be set in the fixing unit and the spectacles frame module. The first data transmission line may transmit a display signal to the display unit. The display unit may display to the user according to the display signal. In addition, although the description is made taking the data transmission line as an example in the present embodiment, the present disclosure is not limited thereto. For example, according to another example of the present disclosure, the display signal may also be transmitted to the display unit by a way of wireless transmission. In addition, according to one example of the present disclosure, the first display module 410 may be the display module of a micro display screen in a small size.

The first optical system 420 may also be set in the spectacles frame module 310. The first optical system 420 may receive the light emitted from the first display module and performs the light path conversion on the light emitted from the first display module to form a first enlarged virtual image. That is to say, the first optical system 420 has a positive refractive power. Thus, the user may view the first image clearly, and the size of the image viewed by the user is not limited by the size of the display unit.

For example, the optical system may include a convex lens. Alternatively, in order to reduce aberration, to avoid the interference to imaging caused by dispersion or the like and to bring a better visual experience to the user, the optical system may also form a lens component by multiple lenses including convex lenses and concave lenses. In addition, according to one example of the present disclosure, the first display module 410 and the first optical system 420 may be set along the optical axis of the optical system correspondingly. Alternatively, according to another example of the present disclosure, the display unit may further include a fifth optical guide means to transmit the light emitted from the first display module 410 to the first optical system 420.

As shown in FIG. 5, after the first optical system 420 receives the light emitted from the first display module 410 and performs the optical path conversion on the light emitted from the first display module 410, the first optical guide means 430 may transmit the light passing through the first optical system to the second optical guide means 440. The second optical guide means 440 may be set in the lens means 320. And, the second optical guide means may receive the light transmitted by the first optical guide means 430 and reflects the light transmitted by the first optical guide means 430 to eyes of the user with the head-mounted electronic device worn.

Back to FIG. 3a, optionally, the lens means 320 meet a first predetermined transmittance in a direction from inside to outside, so that the user can view the surrounding environment while viewing the first enlarged virtual image. For example, in a case that the display unit performs displaying according to the travelling direction of the electronic device when passing through a first geographical position corresponding to the target position information, the user sees an identifier indicating a direction displayed by the display unit while seeing the scene located at the first geographical position corresponding to the target position information through lenses.

Those ordinary skills in the art may recognize that units and algorithm steps of respective examples described in conjunction with embodiments disclosed in this specification can be realized by electronic hardware, computer software or the combination thereof. And, a software module may be set in a computer storage medium in any form. In order to clearly explain the interchangeability of hardware and software, components and steps of respective examples have been described generally in terms of functions in the above description. Whether these functions are performed by hardware or software depends on the particular applications and design constraints of a technical solution. Those skilled in the art may use different methods to realize the described functions for each of particular applications, however such realization should not be considered to be beyond the scope of the present disclosure.

Those skilled in the art should understand that any modification, combination, partial combination and replacement may be made to the present disclosure depending on design requirements and other factors, as long as the modification, combination, partial combination and replacement are within the scope of the appended claims and the equivalent thereof.

The invention claimed is:

1. A control method applied to an electronic device including a collection unit, the control method comprising:
   performing collection on a space operation area through the collection unit and acquiring a real-time collection image regarding the space operation area;
   according to the real-time collection image, determining whether a first finger and a second finger belonging to a same hand of a user are present in the space operation area;
   when determining that the first finger and the second finger belonging to the same hand of the user are present in the space operation area, acquiring a first distance between a first fingertip portion of the first finger and a second fingertip portion of the second finger, and generating a first determination result according to the first distance;
   according to a real-time collection image collected after the first determination result is generated, further determining whether the first fingertip portion leaves the second fingertip portion along a direction away from the user's body or determining whether the first fingertip portion approaches the second fingertip portion along a direction approaching the user's body; and
   when determining that the first fingertip portion leaves the second fingertip portion along the direction away from the user's body or determining that the first fingertip portion approaches the second fingertip portion along the direction approaching the user's body, generating a control instruction according to the real-time collection image collected after the first determination result is generated,
   wherein the direction away from the user's body and the direction approaching the user's body both are a direction perpendicular to a plane parallel to the user's chest,
   wherein generating the control instruction according to the real-time collection image collected after the first determination result is generated comprises:
   acquiring a motion parameter of the first fingertip portion according to the real-time collection image collected after the first determination result is generated; and
   generating the control instruction according to the motion parameter of the first fingertip portion,
   the motion parameter comprises a movement speed of the first fingertip portion.

2. The control method according to claim 1 wherein
   the generating the first determination result according to the first distance comprises:
   determining whether the fingertip of the first finger contacts the fingertip of the second finger according to the first distance;
   when determining that the fingertip of the first finger contacts the fingertip of the second finger, determining whether the contact of the first finger with the second finger encloses a closed area; and
   when determining that the contact of the first finger with the second finger encloses the closed area, generating the first determination result,
   the according to the real-time collection image collected after the first determination result is generated, further determining whether the first fingertip portion leaves the second fingertip portion along the direction away from the user's body or determining whether the first fingertip portion approaches the second fingertip portion along the direction approaching the user's body comprises:
   according to the real-time collection image collected after the first determination result is generated, further determining whether the first fingertip portion leaves the second fingertip portion along a direction away from the user's body,
   the when determining that the first fingertip portion leaves the second fingertip portion along the direction away from the user's body or determining that the first fingertip portion approaches the second fingertip portion along the direction approaching the user's body, generating the control instruction according to the real-time collection image collected after the first determination result is generated comprises:
   when determining that the first fingertip portion leaves the second fingertip portion along the direction away from the user's body, generating the control instruction according to the real-time collection image collected after the first determination result is generated.

3. The control method according to claim 2, further comprising:
   displaying a user interface which includes a plurality of operation objects therein;
   when determining that the contact of the first finger with the second finger encloses the closed area and generating the first determination result, acquiring a mapping position in the user interface of the contact point where the first finger contacts the second finger;
   among the plurality of operation objects, determining a target object corresponding to the mapping position,
   the generating the control instruction according to the motion parameter of the first fingertip portion comprises:
   generating the control instruction for the target object according to the motion parameter of the first fingertip portion.

4. The control method according to claim 2, wherein
the acquiring the motion parameter of the first fingertip portion according to the real-time collection image collected after the first determination result is generated comprises:
determining whether the first fingertip portion stops moving according to the real-time collection image collected after the first determination result is generated; and
when determining that the first fingertip portion stops moving, acquiring a second distance between the first fingertip portion of the first finger and the second fingertip portion of the second finger,
the generating the control instruction according to the motion parameters of the first finger and/or the second finger comprises:
generating the control instruction according to the first distance and the second distance.

5. The control method according to claim 2, wherein
the acquiring the motion parameter of the first fingertip portion according to the real-time collection image collected after the first determination result is generated comprises:
determining in real time a third distance between the first fingertip portion of the first finger and the second fingertip portion of the second finger according to the real-time collection image collected after the first determination result is generated,
the generating the control instruction according to the motion parameters of the first finger and/or the second finger comprises:
generating the control instruction according to the third distance.

6. A control method applied to an electronic device including a collection unit, the control method comprising:
performing collection on a space operation area through the collection unit and acquiring a real-time collection image regarding the space operation area;
according to the real-time collection image, determining whether a first operating body and a second operating body are present in the space operation area;
when determining that the first operating body and the second operating body are present in the space operation area, acquiring a first distance between the first operating body and the second operating body, and generating a first determination result according to the first distance;
according to a real-time collection image collected after the first determination result is generated, further determining whether the second operating body leaves the first operating body along a direction away from the user's body or determining whether the second operating body approaches the first operating body along a direction approaching the user's body; and
generating a first control instruction when determining that the second operating body leaves the first operating body along the direction away from the user's body or/and generating a second control instruction when determining that the second operating body approaches the first operating body along the direction approaching the user's body,
wherein the direction away from the user's body and the direction approaching the user's body both are a direction perpendicular to a plane parallel to the user's chest,
wherein generating the first control instruction or/and generating the second control instruction comprises:
acquiring a motion parameter of the first operating body according to the real-time collection image collected after the first determination result is generated; and
generating the first control instruction or/and generating the second control instruction according to the motion parameter of the first operating body,
the motion parameter comprises a movement speed of the first fingertip portion.

7. An electronic device, comprising:
a collection unit configured to perform collection on a space operation area and acquire a real-time collection image regarding the space operation area;
an operating body identification unit configured to determine, according to the real-time collection image, whether a first finger and a second finger belonging to a same hand of a user are present in the space operation area;
a first distance detection unit configured to acquire a first distance between a first fingertip portion of the first finger and a second fingertip portion of the second finger when it is determined that the first finger and the second finger belonging to the same hand of the user are present in the space operation area, and to generate a first determination result according to the first distance;
a second distance detection unit configured to further determine, according to a real-time collection image collected after the first determination result is generated, whether the first fingertip portion leaves the second fingertip portion along a direction away from the user's body or whether the first fingertip portion approaches the second fingertip portion along a direction approaching the user's body; and
an instruction generation unit configured to generate a control instruction according to the real-time collection image collected after the first determination result is generated when it is determined that the first fingertip portion leaves the second fingertip portion along the direction away from the user's body or that the first fingertip portion approaches the second fingertip portion along the direction approaching the user's body,
wherein the direction away from the user's body and the direction approaching the user's body both are a direction perpendicular to a plane parallel to the user's chest,
wherein the instruction generation unit comprises:
a parameter acquisition module configured to acquire a motion parameter of the first fingertip portion according to the real-time collection image collected after the first determination result is generated when it is determined that the first fingertip portion leaves the second fingertip portion along the direction away from the user's body or that the first fingertip portion approaches the second fingertip portion along the direction approaching the user's body; and
an instruction generation module configured to generate the control instruction according to the motion parameter of the first fingertip portion,
the motion parameter comprises a movement speed of the first fingertip portion.

8. The electronic device according to claim 7, wherein
the first distance detection unit comprises:
a contact determination module configured to determine whether the fingertip of the first finger contacts the fingertip of the second finger according to the first distance;
an area determination module configured to determine whether the contact of the first finger with the second finger encloses a closed area when it is determined that the fingertip of the first finger contacts the fingertip of the second finger; and a result generation module configured to generate the first determination result when it is determined that the contact of the first finger with the second finger encloses the closed area, the instruction generation unit further determines, according to the real-time collection image collected after the first determination result is generated, whether the first fingertip portion leaves the second fingertip portion along the direction away from the user's body.

9. The electronic device according to claim 8, further comprising:

a display unit configured to display a user interface which includes a plurality of operation objects therein;

a mapping unit configured to acquire a mapping position in the user interface of the contact point where the first finger contacts the second finger when it is determined that the contact of the first finger with the second finger encloses the closed area and the first determination result is generated;

an object determination unit configured to determine a target object corresponding to the mapping position among the plurality of operation objects, wherein the instruction generation unit generates the control instruction for the target object according to the motion parameter of the first fingertip portion.

10. The electronic device according to claim 8, wherein the parameter acquisition unit comprises:

a movement determination module configured to determine whether the first fingertip portion stops moving according to the real-time collection image collected after the first determination result is generated; and a distance acquisition module configured to acquire a second distance between the first fingertip portion of the first finger and the second fingertip portion of the second finger when it is determined that the first fingertip portion stops moving, the instruction generation unit generates the control instruction according to the first distance and the second distance.

11. The electronic device according to claim 8, wherein the parameter acquisition unit comprises:

a distance acquisition module configured to determine in real time a third distance between the first fingertip portion of the first finger and the second fingertip portion of the second finger according to the real-time collection image collected after the first determination result is generated, the instruction generation unit generates the control instruction according to the third distance.

* * * * *